Dec. 15, 1953
J. BLANC
2,662,685
ROTOR FOR FLUID MACHINES
Filed July 7, 1950
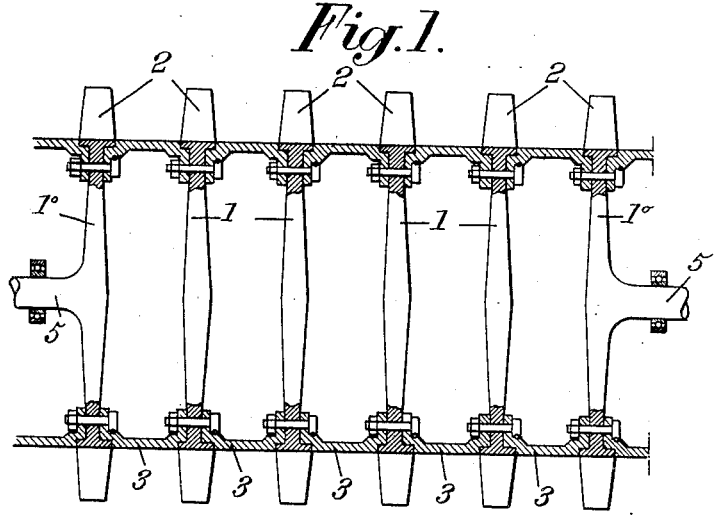
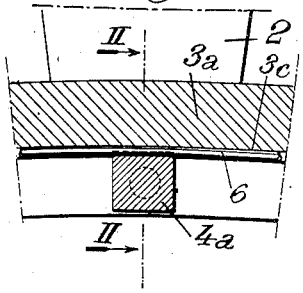
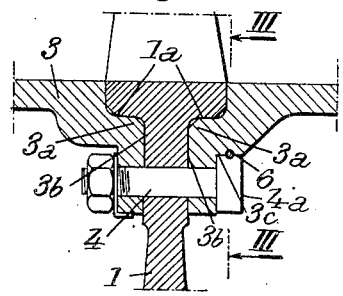
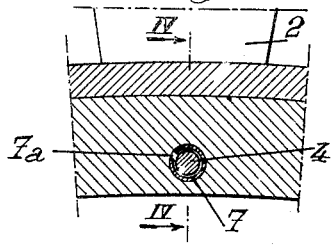
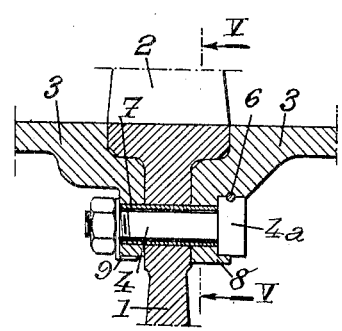
INVENTOR
JACQUES BLANC,
BY Robert H. Lowson
ATTORNEY Patented Dec. 15, 1953

2,662,685

UNITED STATES PATENT OFFICE 2,662,685

ROTOR FOR FLUID MACHINES

Jacques Blanc, Bois-Colombes, France, assignor to Societe d'Exploitation des Materiêls Hispano-Suiza, S. A., Bois-Colombes (Seine), France, a society of France Application July 7, 1950, Serial No. 172,411

Claims priority, application France July 13, 1949

2 Claims. (Cl. 230—134)

1

The invention relates to machines including a rotor fitted with several sets of blades disposed behind one another and it is more particularly, but not exclusively, concerned with axial flow compressors and in particular those for aviation turbo-engines (turbo-jets or turbo-props).

Its chief object is to provide a machine of this kind which is better adapted to comply with the various requirements of practice than those made up to this time and, in particular, which is of lighter weight.

According to my invention, the sets of blades are carried respectively by solid coaxial discs, and said discs are interconnected by cylindrical rings having their edges applied against corresponding inward cylindrical shoulders provided on both faces of each of said discs so as to be forced upon said shoulders by the centrifugal force, each disc being assembled in the longitudinal direction with the cylindrical rings located on either side thereof by bolts parallel to the rotor axis and extending through this disc and through inward flanges provided at the edges of said rings.

Preferred embodiments of my invention will be hereinafter described with reference to the accompanying drawings, given merely by way of example and in which:

Fig. 1 diagrammatically shows, in axial section, the rotor of an axial compressor according to my invention;

Figs. 2 and 3 show, on a larger scale, respectively in axial section on the line II—II of Fig. 3 and in cross section on the line III—III of Fig. 2, details of the assembly of components of said rotor;

Figs. 4 and 5 show, respectively in axial section on the line IV—IV of Fig. 5 and in cross section on the line V—V of Fig. 4, a modification.

My invention will be hereinafter described as applied to an axial compressor intended for instance to be fitted on an aircraft turbo-jet or turbo-prop.

This compressor, as a whole, is of any suitable construction, that is to say it essentially includes a stator (not shown on the drawing) inside which is mounted a rotor fitted with a plurality of blade sets mounted behind one another.

According to my invention, the rotor of this engine is formed by the assembly of a plurality of substantially solid coaxial independent discs 1, each carrying at least one set of blades 2, with interconnecting cylindrical rings 3 coaxial with said discs and the edges 3a of which are engaged against the inner walls of shoulders 1a (Fig. 2) provided on both faces of each disc 1.

2

Furthermore, the cylindrical rings 3 located on either side of a disc 1 are locked therewith longitudinally by means of bolts 4 parallel to the rotor axis and passing through the body of the disc and the inwardly flanged edges 3a of the cylindrical rings, which have substantially plane external faces 3b adapted to bear against the corresponding faces of disc 1.

The rigidity of such a rotor assembly is increased by the fact that, when it is rotating, the centrifugal force imparts greater radial expansion to cylindrical rings 3 than to the substantially solid discs 1, thus tightly applying the edges of these rings 3 against the shoulders 1a of the discs.

It should be noted here that such a rotor has no central shaft and is therefore of lighter weight. It will suffice to provide, for supporting this rotor, on each of the two end discs 1°, a shaft portion 5 extending toward the outside of the engine.

On the other hand, assembly of the various elements by means of individual bolts 4 parallel to the rotor axis permits an easy mounting of the whole of the rotor although the space between two consecutive discs ceases to be accessible once the second of these two discs has been set in position.

In order to assemble a rotor according to my invention, I proceed from the right toward the left (Fig. 1), if it is supposed that the heads of bolts 4 are located on the right hand side thereof.

Of course, once the bolts relative to a given disc are in position, their heads, which are no longer accessible, must not turn.

This result may be obtained, for instance, as shown by Fig. 3, by giving the head 4a of each bolt a polygonal section, for instance a square one, of the sides of which bears against a cylindrical surface 3c machined for this purpose on the inner face of the ring flange 3a with which the head of the bolt in question is to cooperate.

On the other hand, still in order to facilitate the placing and tightening of bolts 4, it will be advantageous to provide means for preventing said bolts from moving backward and therefore dropping into the space limited by two discs already set in position. I may, for instance, constitute such means by a resilient ring 6, preferably of steel wire, engaging partly in a groove provided in cylindrical surface 3c and partly in a corresponding groove provided in the head 4a of each bolt, which ring may be either of a single piece extending about a whole circumference or divided into several sections, possibly connected together. Anyway, ring or ring element 6 resiliently locks the corresponding bolts 4 on their disc 1 in the manner of a key.

It will be understood that, in the case of a rotor made according to the embodiment shown by Figs. 1 to 3, a portion of the transmission of the driving torque takes place through bolts which are thus subjected not only to tension stresses but also to shearing stresses.

These shearing stresses may be eliminated by making use of the modification illustrated by Figs. 4 and 5 and according to which I insert, between the body of bolt 4 and the holes through which said bolt is passing, a sleeve 7 elastic in the radial direction, for instance owing to a slot 7a provided along one generatrix thereof.

It therefore suffices to provide, for the holes through which the bolts proper are to pass, a diameter substantially larger than that of said bolts, which holes need not be machined with as much precision as in the preceding case. In particular, the three holes corresponding to the same bolt need not be adjusted simultaneously since the elasticity of split ring 7 allows for a slight lack of alinement.

According to this modification, means, such for instance as a flange 8 supporting the bolt head 4a on the side of the rotor axis, are provided for preventing said bolt head from disengaging from resilient ring 6 before the elastic sheath 7 is engaged.

The order of the assembly operations is as follows:

Bolts 4 are placed in the right hand side cylindrical ring 3;

Resilient ring 6 is placed;

Disc 1 is mounted in alinement with the right hand side annular ring 3;

The left hand cylindrical ring 3 is mounted in alinement with disc 1;

Elastic sheaths 7 are forced in position;

The nut of each bolt is tightened and eventually this nut is locked by means of a conventional nut lock.

Concerning this construction, it will be noted that it may be of interest in some cases to provide a certain radial play upon assembly for the parts to be mounted in alinement, whereby the stresses developed by the radial deformations due to centrifugal force do not get exaggerate values.

Such an axial compressor construction is very advantageous in practice, both from the point of view of its rigidity and of the simplicity of machining of its elements.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of theh accompanying claims.

What I claim is:

1. A rotor which comprises, in combination, a plurality of at least substantially solid coaxial discs, both sides of each disc peripheral portion having a cylindrical flange thereon, the radially inner surfaces of said flanges being cylindrical and coaxial with the disc axis on either face of its peripheral portion, at least one set of blades carried by each of said discs on its periphery, means for interconnecting said discs constituted exclusively by a plurality of cylindrical rings each interposed between consecutive discs and having edge portions of the cylindrical outer surfaces of said rings within and bearing against the corresponding cylindrical inner surfaces of said two discs, said edge portions including substantially radially inwardly directed flanges, and a plurality of bolts parallel to the common axis of said discs and said rings, each of said bolts extending through one disc and the inwardly directed flanges of the two cylindrical rings adjoining this disc on either side thereof for assembling this disc and these rings in the longitudinal direction, and rotor supporting shaft means constituted exclusively by two shaft elements rigid with the two end discs respectively and extending only on the outer sides of said two discs.

2. A rotor which comprises, in combination, a plurality of at least substantially solid coaxial discs said discs having flat faces, both sides of each disc peripheral portion having a cylindrical flange thereon, the radially inner surfaces of said flanges being cylindrical and coaxial with the disc axis on either face of its peripheral portion, at least one set of blades carried by each of said discs on its periphery, means for interconnecting said discs constituted exclusively by a plurality of cylindrical rings each interposed between consecutive discs and having edge portions of the cylindrical outer surface of said rings within and bearing against the corresponding cylindrical inner surfaces of said two discs, said edge portions including substantially radially inwardly directed flanges having flat faces at least substantially located in planes at right angles to the ring axis and adapted to fit against corresponding flat faces of the adjoining disc, and a plurality of bolts parallel to the common axis of said discs and said rings, each of said bolts extending through one disc and the inwardly directed flanges of the two cylindrical rings adjoining this disc on either side thereof for assembling this disc and these rings in the longitudinal direction, and rotor supporting shaft means constituted exclusively by two shaft elements rigid with the two end discs respectively and extending only on the outer sides of said two discs.

JACQUES BLANC.

References Cited in the file of this patent
UNITED STATES PATENTS

| Number | Name | Date |
|---|---|---|
| 852,030 | Nussbaumer | Apr. 30, 1907 |
| 906,400 | Ferranti | Dec. 8, 1908 |
| 1,118,361 | Lasche | Nov. 24, 1914 |
| 1,210,978 | Parsons | Jan. 2, 1917 |
| 1,873,956 | Dahlstrand | Aug. 30, 1932 |
| 2,461,402 | Whitehead | Feb. 8, 1949 |
| 2,548,858 | Benedict | Apr. 17, 1951 |

FOREIGN PATENTS

| Number | Country | Date |
|---|---|---|
| 900,402 | France | Oct. 2, 1944 |